Figure 1:
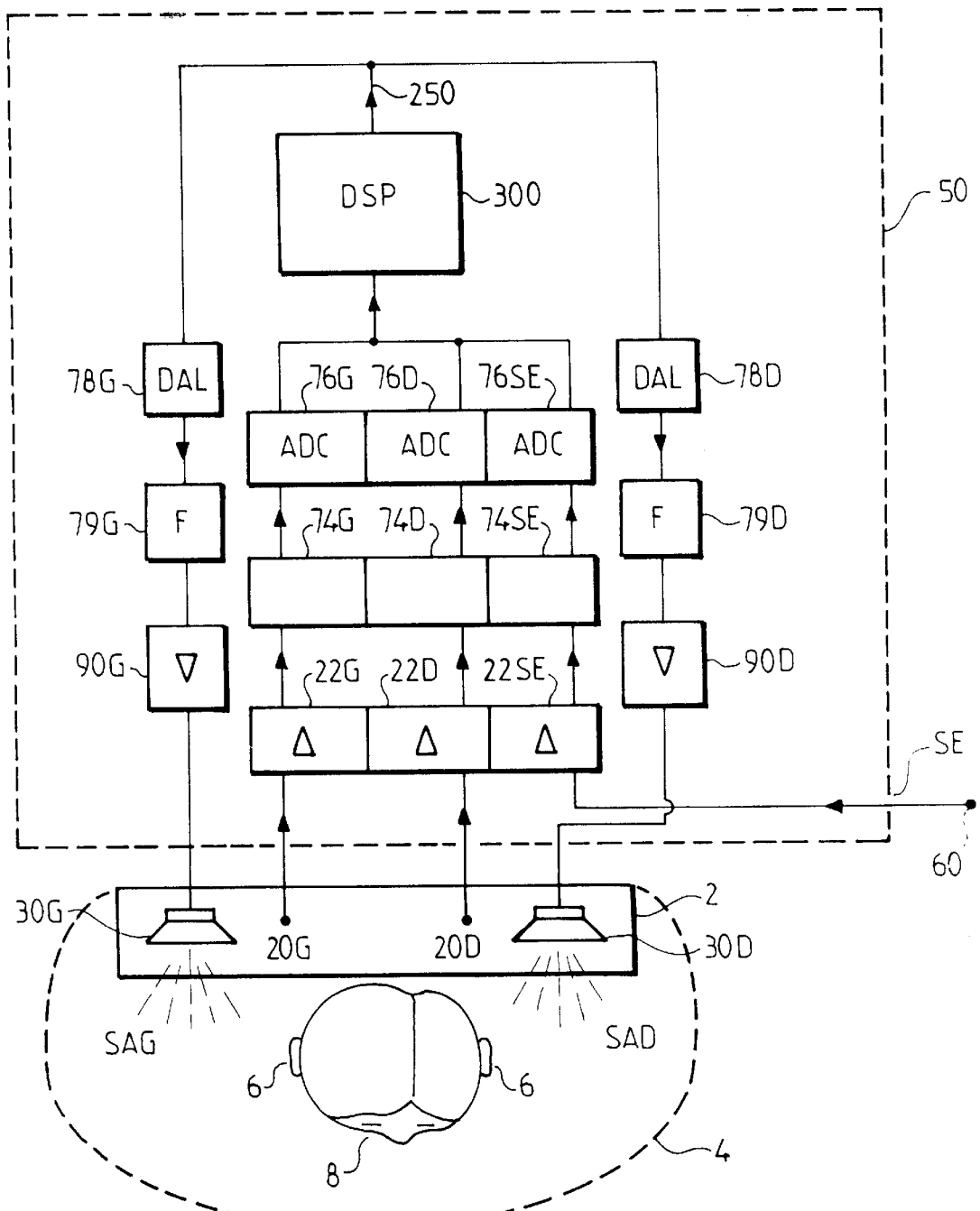

United States Patent
Carme et al.

[11] Patent Number: 5,987,144
[45] Date of Patent: Nov. 16, 1999

[54] PERSONAL ACTIVE NOISE CANCELLATION METHOD AND DEVICE HAVING INVARIANT IMPULSE RESPONSE

[75] Inventors: Christian Carme; Alain Roure, both of Marseille, France

[73] Assignees: Technofirst, Aubagne, France; Centre National de la Recherche Scientifique, Paris, France

[21] Appl. No.: 08/930,226

[22] PCT Filed: Apr. 3, 1996

[86] PCT No.: PCT/FR96/00508

§ 371 Date: Oct. 3, 1997

§ 102(e) Date: Oct. 3, 1997

[87] PCT Pub. No.: WO96/31872

PCT Pub. Date: Oct. 10, 1996

[30] Foreign Application Priority Data

Apr. 4, 1995 [FR] France ................................. 95 03969

[51] Int. Cl.[6] .............................. A61F 11/06; H03B 29/00
[52] U.S. Cl. ........................ 381/72; 381/71.6; 381/71.12; 381/94.7; 381/71.7
[58] Field of Search ................................. 381/71.1, 71.2, 381/71.4, 71.6, 71.7, 71.11, 71.12, 71.13, 71.14, 86, 94.1, 94.7, FOR 123, FOR 124, 72, 73.1

[56] References Cited

U.S. PATENT DOCUMENTS

| | | | |
|---|---|---|---|
| H417 | 1/1988 | Miles | 381/7.6 |
| 4,654,871 | 3/1987 | Chaplin et al. | 381/72 |
| 4,997,600 | 3/1991 | Ziegler | 381/72 |
| 5,133,017 | 7/1992 | Cain et al. | 381/71.6 |
| 5,438,624 | 8/1995 | Lewiner et al. | 381/71.12 |
| 5,502,770 | 3/1996 | Kuo et al. | 381/71.9 |
| 5,559,893 | 9/1996 | Krokstad et al. | 381/71.6 |

FOREIGN PATENT DOCUMENTS

| | | |
|---|---|---|
| 0342353 | 11/1989 | European Pat. Off. . |
| 0601934 | 6/1994 | European Pat. Off. . |
| 2704084 | 10/1994 | France . |
| 2149614 | 6/1985 | United Kingdom . |
| 89/11841 | 12/1989 | WIPO . |
| 91/15896 | 10/1991 | WIPO . |
| 94/25835 | 11/1994 | WIPO . |
| 94/29845 | 12/1994 | WIPO . |
| 94/29848 | 12/1994 | WIPO . |
| 95/00946 | 1/1995 | WIPO . |

*Primary Examiner*—Forester W. Isen
*Assistant Examiner*—Xu Mei
*Attorney, Agent, or Firm*—Venable; George H. Spencer

[57] ABSTRACT

A selected electrical signal is first applied to the input of a source (30) to determine at least the impulse response (H), over a predetermined time, between the source output and the input of sensors (20). The values of the active cancellation control signal are determined in real time according to a predetermined law established in accordance with the previously determined impulse response (H), whereby the energy of the output signal from the sensors is minimised. The acoustic structure (2) is arranged so that the space (534) containing the sensors (20) and the source (30) is invariant at least during the determination of the active cancellation control signal and in the presence of a person, whereby the impulse response (H) between the output of the source (30) and the input of the sensors (20) may remain invariant.

14 Claims, 5 Drawing Sheets

PERSONAL ACTIVE NOISE CANCELLATION METHOD AND DEVICE HAVING INVARIANT IMPULSE RESPONSE

The present invention relates to active acoustic attenuation—that is to say, the operation that permits certain sounds to be attenuated by superimposing other sounds that are created in antiphase with the sounds to be attenuated.

The invention finds general application in the soundproofing of a space of chosen dimensions, and more particularly the space containing at least the head of a passenger sitting on a seat of a motorized vehicle such as an aircraft or an automobile with a view to improving the acoustic comfort of said passenger.

U.S. Pat. No. 5,133,017 (CAIN) proposes a seat equipped with a personal device for active acoustic attenuation which is integrated within the head-rest of the seat. The device comprises two channels disposed on the front face of the head-rest of the seat. Each channel possesses a loudspeaker linked to a ring of microphones. Electronic control means receive the noise picked up by the two rings of microphones and deliver, after processing, a control signal for noise attenuation for each loudspeaker in order to create sounds in antiphase with the noise to be attenuated.

The arrangement of the microphones in a ring here permits deterioration of the results to be avoided in the event of movements of the head of the individual or in the case of masking of a particular point of the ring by hair or such like. But this avoidance is obtained at the expense of a complexity of execution (due in particular to the number of microphones to be implemented) and the necessity to calculate the mean value of the noises picked up by each ring of microphones in order to improve the acoustic reproduction of the attenuation control signal.

The present invention provides a remedy for these drawbacks.

The invention focuses on a personal method for active acoustic attenuation comprising the following stages:

a) a source is provided that is suitable to deliver an active attenuation signal in order to reduce an unwanted noise in response to a received control signal, b) sensor means are provided for picking up the unwanted noise, c) an acoustic structure is provided that is suitable to support the source as well as the sensor means in proximity to the head of an individual, d) electronic control means are provided that are suitable to generate the active attenuation control signal for the source, e) a selected electrical signal is applied beforehand to the input of the source in order to determine at least the impulse response, during a predetermined period, between the output of the source and the input of the sensor means, and f) in real time the active acoustic attenuation control signal is determined in accordance with a predetermined processing rule that is established at least in accordance with the impulse response as determined previously, in order to minimize the energy of the signal delivered by the sensor means.

According to a general definition of the invention, stage c) consists in converting said acoustic structure in order to maintain invariant, at least during the determination of the active attenuation control signal and in the presence of the individual, the volume within which the sensor means and the source are accommodated, permitting the impulse response between the output of the source and the input of the sensor means to be maintained invariant.

In this manner, owing to the invariance of the volume containing the sensor means and the source, and consequently the invariance of the impulse response between the output of the source and the input of the sensor means, the determination of the active acoustic attenuation signal has less need for processing.

Another aim of the present invention is a personal device for active acoustic attenuation in order to implement the method according to the invention, comprising:

a source that is suitable to deliver an active acoustic attenuation signal in order to reduce an unwanted noise in response to a received control signal, sensor means for picking up the unwanted noise, an acoustic structure that is suitable to support the source as well as the sensor means in proximity to the head of an individual, electronic control means that are suitable to apply, beforehand, a selected electrical signal to the input of the source in order to determine at least one impulse response, during a predetermined period, between the output of the source and the input of the sensor means and to determine, in real time, said active attenuation control signal in accordance with a predetermined processing rule that is established at least in accordance with the impulse response as determined previously, in order to minimize the energy of the signal delivered by the sensor means.

According to a general definition of the device according to the invention, the acoustic structure comprises means of support and protection in order to maintain invariant, at least during the determination of the active acoustic attenuation control signal and in the presence of the individual, the volume within which the sensor means and the source are accommodated, permitting the impulse response between the output of the source and the input of the sensor means to be maintained invariant.

According to a preferred embodiment of the invention the support means comprise a casing comprising substantially acoustically opaque walls, an opening intended to be disposed in proximity to the head of the individual and a partition which is substantially acoustically opaque and which divides said partition into first and second cavities, the first cavity being open in accordance with said opening and containing the sensor means, whereas the source is supported by the partition in such a manner that the signal emitted from the source is propagated directly into the first cavity, towards the opening in the partition.

In practice, the means of protection comprise a grille or a similar device which is retractable, covered with a substantially acoustically transparent material and intended to be folded over the opening in the first cavity in order to maintain invariant the volume of said first cavity, even in the presence of the individual.

According to the invention, the invariance of this volume and this impulse response is thus obtained by mechanical means which are relatively simple and inexpensive and which can be put into effect in proximity to the space to be acoustically attenuated, facilitating the achievement of a sufficient active acoustic attenuation and also contributing to reducing the costs of implementing the invention.

The acoustic structure is preferably totally integrated within the upper part of a seat or a similar object.

The device described in the aforementioned patent U.S. Pat. No. 5,133,017 (CAIN) utilizes the technique of active acoustic attenuation by retroaction, also called "feed back", based on the sensing of the sounds emanating from the points disposed in proximity to the microphones. This technique has a relatively low efficiency, for it attenuates the noises solely around the plurality of the points where the sounds are sensed. This technique is therefore not wholly satisfactory for obtaining acoustic attenuation in a space of chosen dimensions and, more particularly, the space containing the head of a passenger sitting on a seat.

U.S. Pat. No. 4,977,600 (ZIEGLER) describes another technique for active acoustic attenuation, called the "synchronous" technique.

The technique here is based on an operation that permits harmonic sounds to be attenuated by causing them to interfere with a predetermined signal which is emitted from a synchronous reference and which is in phase opposition.

This signal emitted from a synchronous reference is a signal which is synthetic (for example, generated by a synthesizer driven by the tachometer of the motorization units of the aircraft), global, not sensed, and presumed to correspond to the inverse of the noise to be attenuated. Now, in practice, it is observed that the consistency between a measured signal and its modelling (synthetic signal) is good enough for speech (speech synthesis), but it is very poor for noise.

Such a device can therefore serve only to attenuate a noise composed of a pure frequency and its harmonics. It does not permit active attenuation of noise within a broad band of frequencies. This technique therefore cannot be used in order to obtain active acoustic attenuation in noisy environments consisting of random noises.

Known furthermore is an active acoustic attenuation based on the technique by anticipation also known as "feed forward". Patent FR 83 13502 describes such a technique applied in particular to the broadband noises propagated along a guide such as a ventilation shaft. In this case an active acoustic attenuation is obtained at the shaft output by detecting upstream the noise emanating from the ventilation motor, by injecting an opposing noise transversely into the shaft as a function of the upstream noise detected in this manner, and by checking the resulting acoustic attenuation by detecting, downstream of the injection of the opposing noise, the residual noise propagated in the shaft.

The major difference between the "synchronous" technique and the technique by anticipation consists in elaborating the opposing noise as a function of a measurement by microphone of the upstream noise being propagated in the space to be subject to noise-reduction ("feed forward" technique), instead of a synthetic signal ("synchronous" technique).

It would be theoretically possible to utilize the technique by anticipation for the soundproofing of a space of chosen dimensions containing at least the head of a passenger sitting on a seat. But the complexity, the interaction of the passenger with the microphones and loudspeakers, the absence of knowledge of the propagation of the noise in this space, and the cost of such a device have meant that those skilled in the art have not hitherto contemplated its implementation in this application.

On the other hand, the applicants have observed that the absence of knowledge of the propagation of the noise in the space containing the head of the passenger is not a hindrance, a fact that opens up certain possibilities.

Thus the method according to the invention is of the type that operates by anticipation and comprises moreover the following stage:

g) remote sensor means are provided, disposed at a chosen location and suitable to pick up, in real time, an unwanted noise that is capable of being propagated from said location towards said space, the processing rule being established moreover in accordance with the remote noise picked up in this manner.

Another object of the invention is a noise-reduced space obtained by means of the device according to the invention, said noise-reduced space being independent, local, interchangeable, and of "generous" dimensions, and the active acoustic attenuation of said space being capable of being augmented at least partially by that of another noise-reduced space overlapping said space at least partially.

Figure 2:
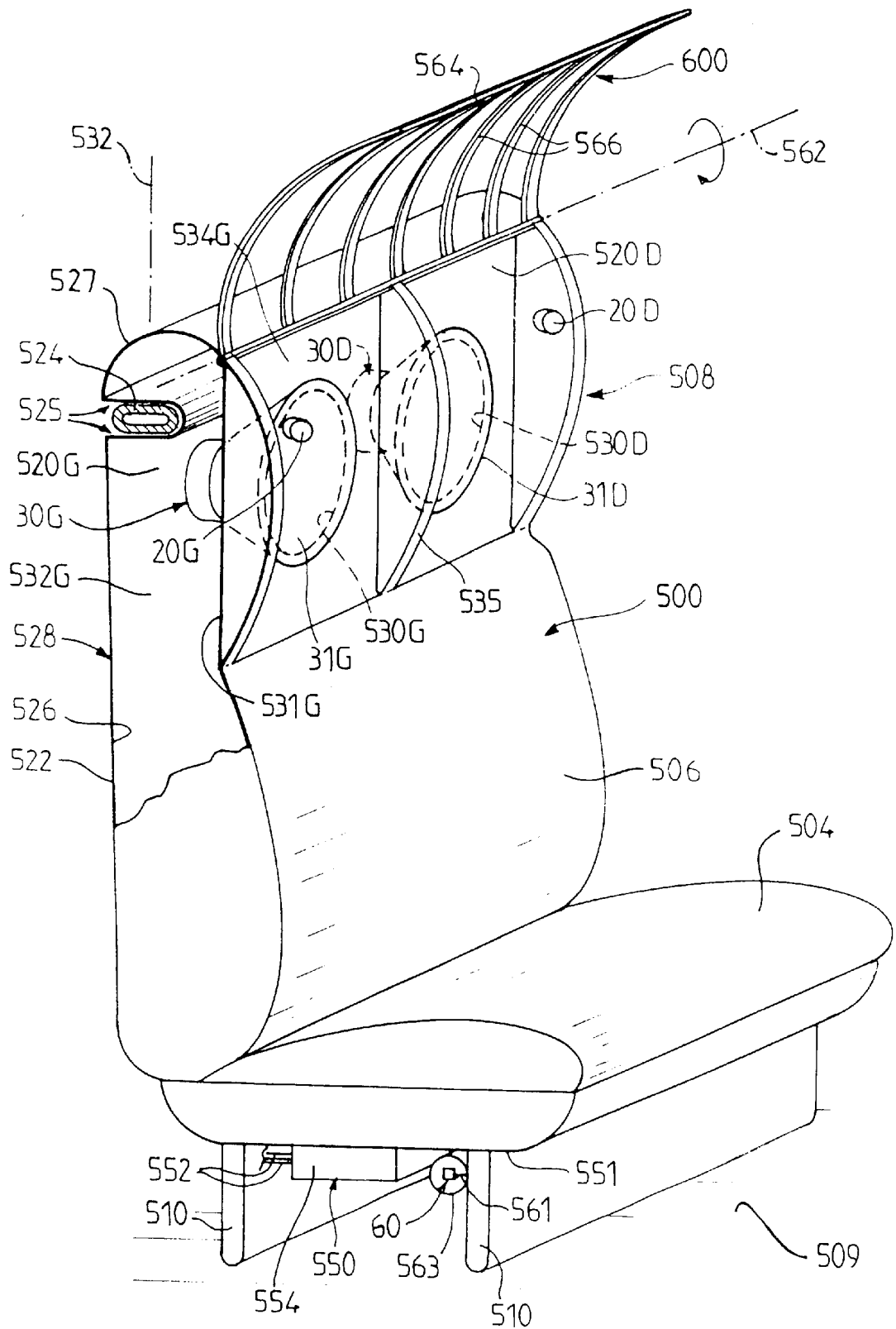
Figure 3:
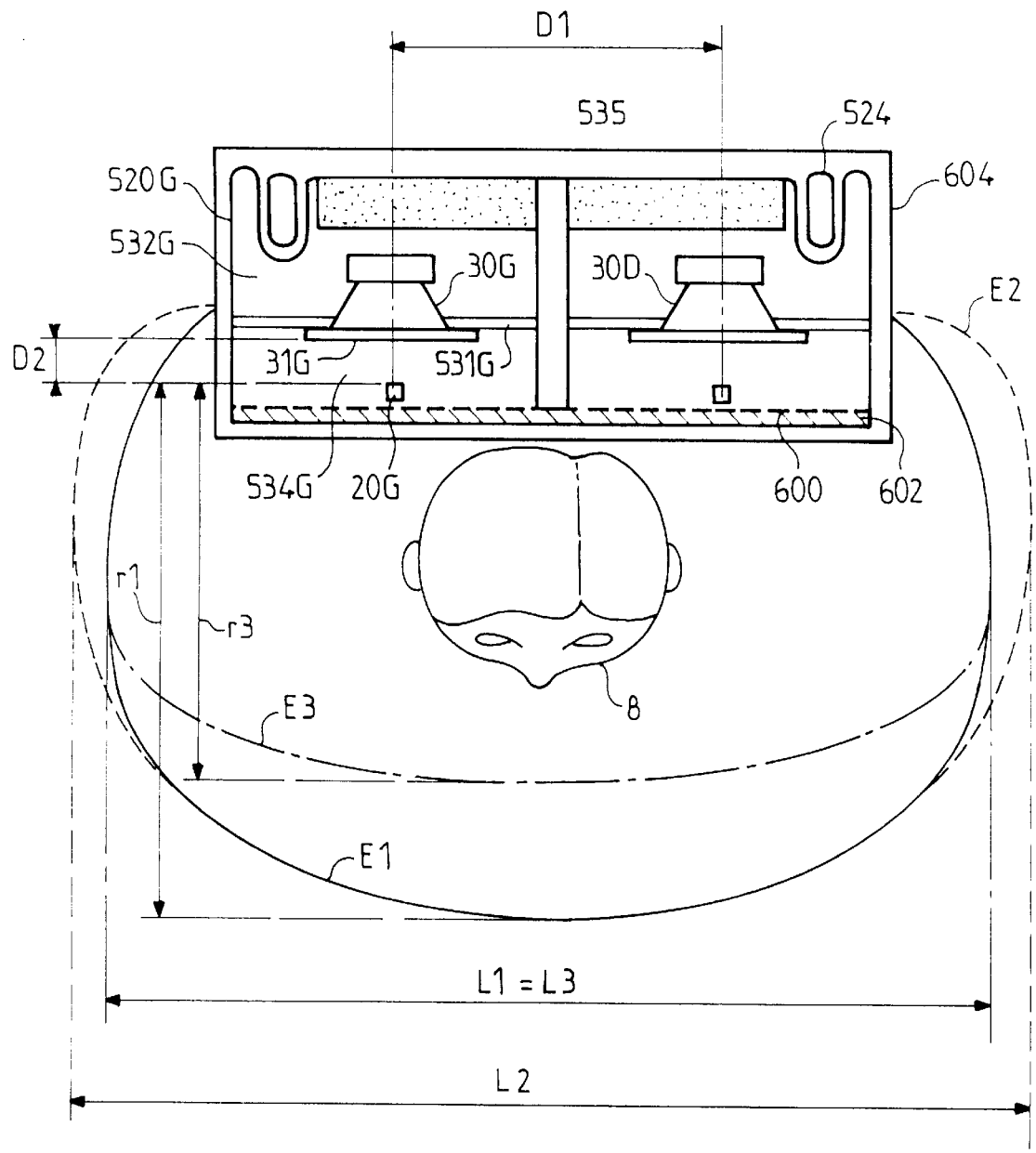
Figure 4:
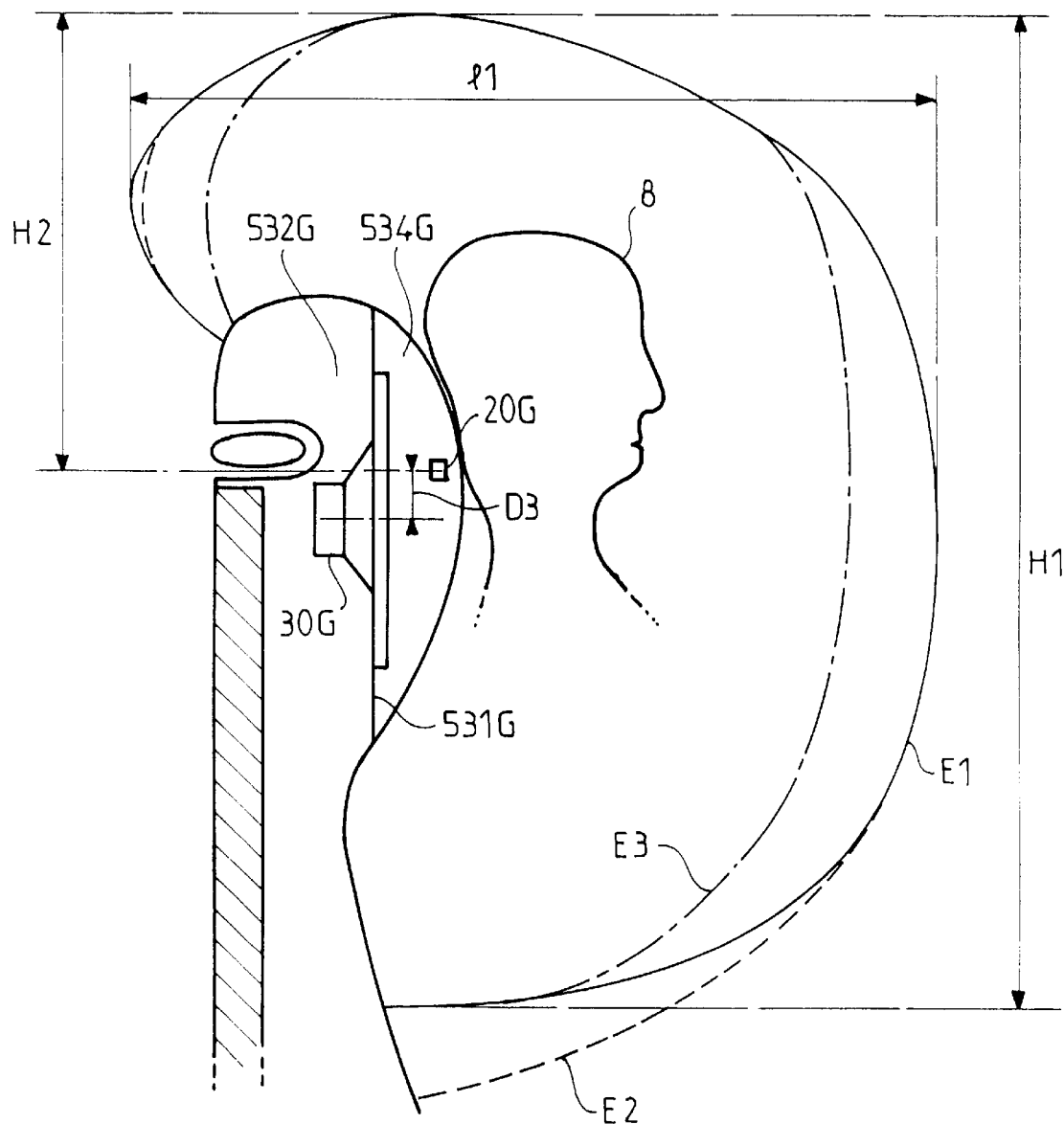
Figure 5:
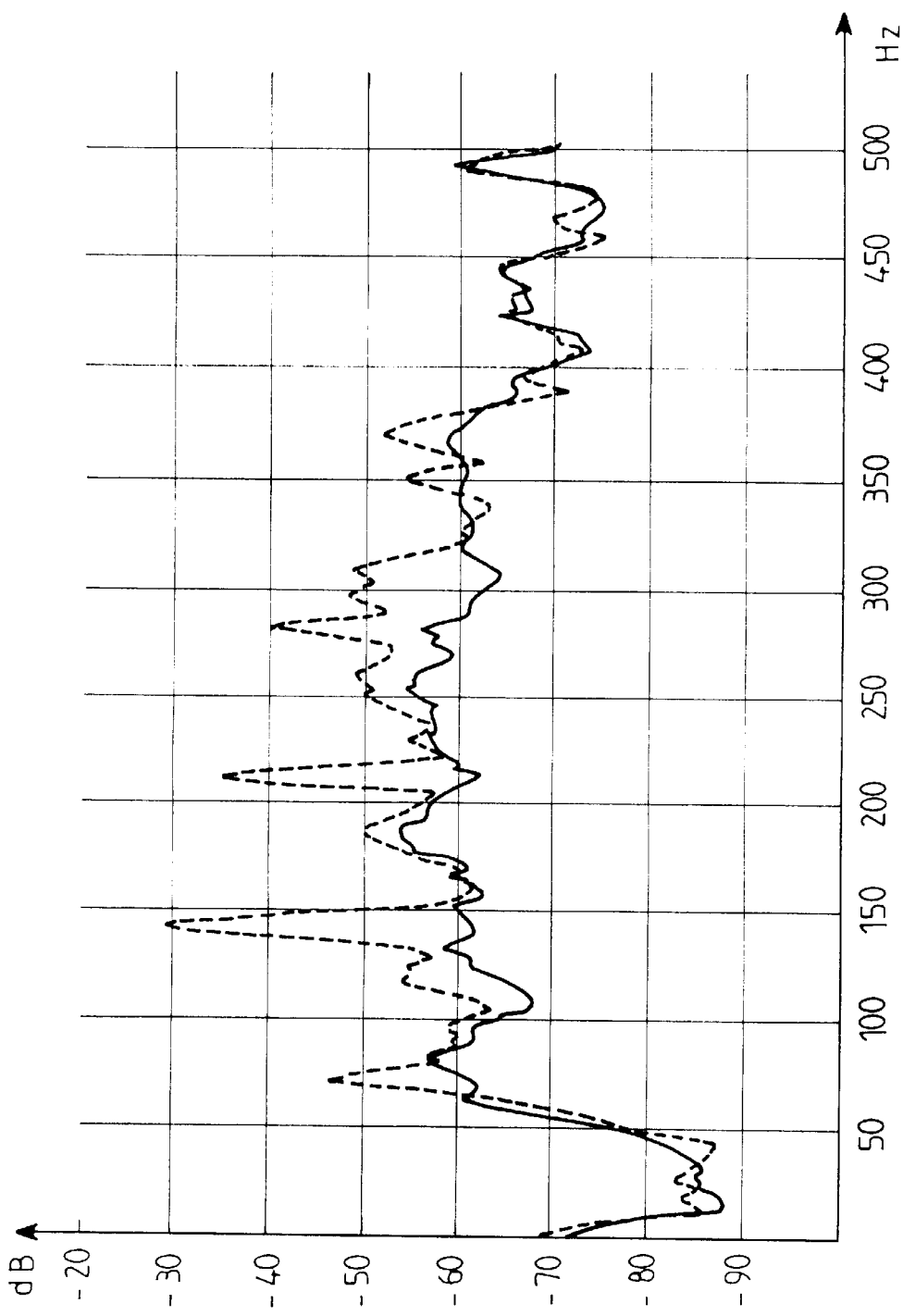

Other characteristics and advantages of the invention will emerge in the light of the detailed description below and the drawings, in which:

FIG. 1 is a schematic representation of the personal device for active acoustic attenuation according to the invention, FIG. 2 represents, in side view and partial section, a seat equipped with a personal device for attenuation according to the invention, FIG. 3 is a top view representing schematically the noise-reduced space according to the invention, FIG. 4 is a side view, in section, representing schematically the noise-reduced space according to the invention, and FIG. 5 is a diagram showing the active acoustic attenuation obtained by means of a device according to the invention.

With reference to FIG. 1, the personal device for active acoustic attenuation comprises an acoustic structure 2 that is intended to provide a space 4 for active acoustic attenuation containing at least the head (here the ears 6) of an individual 8.

As will be seen in more detail below, the space 4 is advantageously that which contains the head of a passenger sitting on a seat of a motorized vehicle such as an aircraft or an automobile with a view to improving the acoustic comfort of the passenger using said seat. In other applications the space for active acoustic attenuation may be that obtained in the vicinity of a work station or in the vicinity of a wall within which the acoustic structure 2 is integrated.

In general the device comprises, in the space 4, a source 30 of sounds and sensor means 20 for picking up sounds. It may be mono-channel or multi-channel—that is to say, the source 30 may comprise one or more acoustic transducers such as loudspeakers or similar devices and the sensor means 20 may comprise one or more acoustic transducers such as microphones or similar devices (pressure sensors). The device according to the invention preferably has two channels, each channel being associated with an ear. The references of the constituent elements of the channel disposed to the right of the seat are followed by the letter D, whereas the references of the constituent elements of the channel disposed to the left of the seat are followed by the letter G.

Electronic control means 50 generate the active attenuation control signal for the source 30.

In the seat application the electronic control means 50 are fixed at the level of the lower part of the seat.

According to the invention, remote sensor means 60 are provided, disposed preferably outside the space 4, in order to pick up an unwanted noise SE which is external to the space and capable of being propagated, preferably without guidance, into the space 4 after a certain delay. These remote sensor means 60 are, for example, fixed to a foot of the seat, as will be seen in more detail below.

It is to be noted that in a variant the device can function with a remote sensor disposed in the space 4 to be subject to noise-reduction. In this case it is advisable to implement an algorithm that filters the perturbation caused by the source on the remote sensor.

In accordance with the basic principle of the active acoustic attenuation according to the invention, the control means 50 apply, beforehand, a selected electrical signal to the input of the source in order to determine at least one impulse response H between the output of the source 30 and the input of the sensor means 20. In accordance with said impulse response H as determined previously and the remote noise SE as picked up in real time, the electronic control means determine, in real time, the values of the active attenuation control signal in accordance with a predetermined rule that is established in order to minimize at least the energy of the signal delivered by the sensor means.

It is appropriate to note here that the personal device for noise attenuation according to the invention is distinguished from patent U.S. Pat. No. 4,977,600 cited above by virtue of the fact that the active attenuation here is broadband in frequency, inasmuch as the signal SE picked up by the remote sensor means is itself broadband in frequency, unlike the synthetic signal in the narrowband associated with the aforementioned patent. This results in better active acoustic attenuation.

In the following description the term 'impulse response' in the time domain is equivalent to the term 'transfer function' in the frequency domain. Likewise, the algorithms described below are those pertaining to the time domain, but in practice they may pertain to the frequency domain or to a combination of these two domains.

The detailed structure and the operation of the personal attenuation device of the invention, in the case of such a device having two channels, are the following.

The remote microphone 60 drives the input of a pre-amplifier 22SE. The output of the pre-amplifier 22SE is linked to the input of an anti-overlapping filter 74SE (so-called anti-aliasing filter). The output of the filter 74SE is linked to the input of an analogue/digital converter 76SE, the output of which is linked to digital processing means 300 via a databus 200.

The analogue/digital converter 76SE operates, for example, with 12 bits.

In the same way, each microphone 20G and 20D drives the input of a respective pre-amplifier 22G and 22D. The output of each pre-amplifier 22G and 22D is linked to the input of a respective anti-overlapping filter 74G and 74D. The output of each filter 74G and 74D is linked to the input of a respective analogue/digital converter 76G and 76D, the output of which is linked to the digital processing means 300 via the databus 200.

The anti-overlapping filtering elements 74D, 74G and 74SE are, for example, filters of the programmable type ELLIPTIQUE of order 7 with switched capacities.

The output 250 of the digital processing means 300 drives the two active acoustic attenuation channels, namely the right channel D and the left channel G. The right channel D comprises a digital/analogue converter 78D, the input of which is linked to the output of the digital processing means 300 and the output of which drives the input of a smoothing filter 79D. The output of the filter 79D is linked to the input of a power amplifier 90D, the output of which drives the loudspeaker 30D which diffuses the active acoustic attenuation signal SAD. The left channel G is symmetrical to the right channel D and comprises the same elements as the left channel, namely: a digital/analogue converter 78G, a smoothing filter 79G and a power amplifier 90G linked to the loudspeaker 30G which diffuses the active acoustic attenuation signal SAG.

The power amplifiers 90D and 90G have, for example, a nominal power of 10 Watts, effective below 8 Ohms. They are advantageously of hi-fi quality. The total ratio of harmonic distortion is, for example, lower than 0.2% for an effective power of 10 Watts.

The pre-amplifiers 22D, 22G and 22SE are, for example, standard operational amplifiers.

The digital processing means 300 comprise, for example, a processor such as that sold by TEXAS INSTRUMENTS under the reference TMS320P25.

In practice, at the time of installation of the device in the aircraft or otherwise at a manufacturing site it is necessary to effect an adjustment stage, the objective of which is to take up a position at the maximum of the dynamic range of the converters.

This adjustment is carried out, for example, by simulating an unwanted noise to be attenuated which is close to that to be attenuated in operation, with the aid of an electro-acoustic system (not shown), for example a system comprising a cassette-reading unit, an amplifier and an acoustic speaker.

The power of the electro-acoustic system is adjusted in order to exhibit in the region of the space 4 a noise level equivalent to that existing in operation, for example when the aircraft is in flight phase.

The electro-acoustic system being in operation, the value of the gain of the pre-amplifier 22E is adjusted in order to exhibit at the output of this pre-amplifier a signal level close to but substantially lower than the signal level admitted by the analogue/digital converter 76SE. Such an adjustment advantageously permits the maximum of the dynamic range of this converter to be attained. This adjustment is repeated for the pre-amplifiers 22D and 22G.

After this adjustment stage, determination of the impulse response is effected in the following way.

First of all the digital processing means 300 send, successively with respect to each of the converters 78, a selected identification signal, for example a Dirac signal, a white noise or some other noise.

Advantageously the gain of the right and left amplifiers 90D and 90G is adjusted afterwards for the right and left channels D and G, in order that the excitation of the right and left loudspeakers 30D and 30G produces at the output of the pre-amplifiers 22S and 22G a signal level close to that adjusted in the course of the preceding stage relative to the dynamic adjustment of the converters.

Once the gains of the two output channels have been adjusted in this manner, the effects of the loudspeakers on the outputs of the microphones 20 are determined and the impulse responses between loudspeakers and microphones are deduced.

In practice, the impulse responses are measured during a predetermined period, for example on 80 measurement points at the sampling frequency of 1,000 Hz.

The determination of the impulse responses can be achieved in open-loop configuration—that is to say, in a configuration in which the electro-acoustic system is turned off (that is to say, on the ground).

However, the applicants have observed that the impulse responses obtained in flight are advantageously substantially equal to those in open loop, inasmuch as in the seat application, the microphones 20D and 20G being close to the loudspeakers 30D and 30G, the direct acoustic field predominates over the reflections.

This is why, according to the invention, the procedure for identifying the impulse responses is advantageously executed at a site external to the application, for example in a production factory.

This results in flexibility of use of the device, inasmuch as it is not necessary to devise new electronics for each installation of said device in a structure such as a seat.

Furthermore, the adjustments of the gains are advantageously effected by means of potentiometers. In a variant, charts may provide, for a certain noise to be attenuated, the values of the potentiometers of the input pre-amplifiers 22D and 22G and of the output pre-amplifiers 90D and 90G.

In the aircraft-seat application, where the noise level to be attenuated evolves as a function of the flight conditions (acceleration, cruising speed, turbulence) and of the aircraft (propellers, jet engines, supersonic, etc), an automatic checking of the gain may adapt, permanently, the values of the input and output gains in order to attain the maximum of the dynamic range of the input converters 76 and to adapt the sound level emitted by the loudspeakers.

Under flight conditions the control means 50 acquire, periodically and in real time, the remote noise picked up by the remote sensor means. They also calculate the energy of the signal, which is representative of the sum of the energies of the signals delivered by the sensor means 20.

Afterwards, the digital processing means, in particular digital filtering elements (not shown), are set in search of the optimal convergence parameter. The knowledge of the impulse responses measured previously and of the remote noise in real time permits a chosen minimization algorithm to determine, in real time, the values of the active acoustic attenuation control signal. The aim of the convergence here is to minimize the energy of the signals delivered by the microphones that are disposed in the space to be subject to noise-reduction.

For example, the minimization algorithm utilizes the Least Mean Squares technique.

In a configuration with one channel—that is to say, with a single sensor, for example a microphone 20, and a single source, for example a loudspeaker 30—the determination of the values of the active attenuation control signal takes into account only the impulse response between the output of the source and the input of the sensor means measured previously and the signal of the remote sensor.

In a configuration with two channels the determination of the values of the active acoustic attenuation control signal is substantially similar to that of the configuration with one channel, being distinguished from this by the cross-over interactions between the loudspeakers 30G, 30D and the microphones 20D and 20G. However, these cross-over interactions are sometimes negligible. Under these conditions only direct impulse responses are advantageously taken into account—that is to say, the impulse responses between sensor and source pertaining to the same channel.

Furthermore it is appropriate to note that it has been considered here that the remote noise is propagated without alteration as far as the space to be subject to noise-reduction and that under these conditions the noise picked up by the remote sensor means 60 is substantially equivalent to that picked up by the sensor means 20.

Now, in practice, changes in the propagation of the remote noise may occur.

Under these conditions the determination of the attenuation control signal is established in accordance with a rule that takes into account not only the impulse response between the source 30 and the sensor means 20, the noise picked up by the sensor means 20 and the noise picked up by the remote sensor means 60 (simple case without alteration), but also the impulse response between the source 30 and the remote sensor means 60 as well as the impulse response between the remote sensor means 60 and the sensor means 20.

With reference to FIG. 2, the seat 500 is equipped with the attenuation device according to the invention. The seat conventionally comprises a base 504 and a back 506. A head-rest 508 is provided in the upper part of the back 506. This seat 500 is provided for a person.

The skeletal structure of the back 506 is constituted by walls 522 and an armature 524 comprising a plurality of curved tubes disposed between the walls 522. The internal face 526 of the walls 522 is advantageously covered with a damping material of mineral-wool type, whereas the external face 528 of the walls 522 is advantageously covered with a trim covering pertaining to the back 506. The tubular armature 524 is accommodated within a cavity 525 that is recessed on the rear face of the walls 522.

The seat is, for example, that of an aircraft passenger or that of an automobile passenger.

The seat rests on the floor 509 by means of feet 510. It is an entirely conventional seat. Only its upper part, at the level of the head-rest, is modified in order to receive, in part, the attenuation device according to the invention.

In the seat application, means 520 support the two loudspeakers 30D and 30G and the two microphones 20D and 20G. These means 520 comprise two identical casings 520D and 520G, each associated with a channel. The casings are semi-closed or closed and are incorporated within the head-rest 508.

Each casing is called semi-closed because it is delimited by the non-rigid and open-worked walls 522 of the rear face of the back. These walls are acoustically opaque. They may be made, for example, of glass wool a few centimeters in thickness.

The two semi-closed casings 520D and 520G are separated by a central partition 535.

In order to simplify the description, the elements of a single channel (here the left channel) are described. Obviously, this description applies to the right channel, mutatis mutandis.

Each casing (for example, that associated with the left channel 520G) comprises acoustically opaque walls, an opening towards the outside and in proximity to the head of the individual and an acoustically opaque transverse partition 531G. This partition 531G divides the casing into two half-cavities, namely a front cavity 534G and a rear cavity 532G. It also supports the loudspeaker 30G. As for the microphone 20G, it is disposed in the front cavity 534G.

The upper part of the head-rest which forms a sort of cap 527 linking the rear cavity 532G to the front cavity 534G is advantageously constituted by a rigid wall in order to halt the propagation of the rear wave of the loudspeaker 30G towards the top of the seat.

An opening 530G is provided in the partition 531G for accommodation of the loudspeaker within the casing 520G.

The front cavity 534 is provided in front of the diaphragm 31G of the loudspeaker 30G.

The microphone 20G is accommodated inside the front cavity 534G in order to be disposed in proximity to the space to be subject to noise-reduction, in accordance with a geometrical rule which will be described in more detail below.

The applicants have observed that the invariance of the impulse response between the source and the sensor means can be obtained by relatively simple and inexpensive mechanical means which can be put into effect close to the space to be acoustically attenuated, facilitating the achievement of a sufficient acoustic attenuation and also contributing to reducing the costs of implementing the invention.

This result is obtained by protection means permitting the semi-closed acoustic casings described above to be protected from acoustic instabilities that arise, for example, from the movement of the head of the individual or from mechanical intrusions entering the front cavities 534D and 534G from the outside.

With reference to FIG. 2, these protection means comprise a grille 600 which is pivotally mounted in relation to a horizontal axis 562 at the level of the upper part of the head-rest 508 (the back 506 is considered as extending along a vertical axis 532). The grille is represented in its open position. In its operational position it is capable of being folded over in front of the partitions 531. In this way the grille protects the microphones and the diaphragms disposed in each front cavity 534G and 534D as described above.

It should be noted that the grille delimits the volume of each front cavity 534, which thus remains invariant, permitting an invariant impulse response to be obtained. The grille is acoustically transparent and rigid. Its shape conforms advantageously to that of the head-rest.

This grille 600 comprises, for example, rectilinear bars 564 linking curvilinear bars 566. In a variant the protection means comprise an open-worked and acoustically transparent wall.

In practice, provision is made to cover the grille with an open-celled, acoustically transparent foam 602 for the comfort of the passenger, or with a perforated fire-retardant foam. This foam 602 is advantageously covered with a fabric 604 which is likewise acoustically transparent.

Furthermore, the electronic control means 50 that generate the attenuation control signal for the source are accommodated within a housing 550 that is fixed to the lower face 551 of the base 504.

In practice, the remote sensor means 60 are disposed outside the space 4 to be subject to noise-reduction, in order to pick up an undesired noise that is external to the space 4 and capable of being propagated freely in said space. These remote sensor means are, for example, a microphone 60 fixed to a foot 510 of the seat by means of a support 561.

The remote microphone 60 is advantageously protected from the outside by a grille 563 surrounding said remote microphone.

In a variant the remote microphone 60 may be replaced or complemented by an accelerometer. The information emanating from the accelerometer may be utilized as a signal that is representative of the noise.

Cables or connections 552 are provided in order to link the control means 50 to the source 30, to the sensors 20, and also to the remote sensor means 60. The device is fully autonomous, inasmuch as it comprises a power-supply input 554 linked to the on-board power supply of the aircraft.

In order to obtain a coherence between the sensor means 20 and the external sensor means 60, the device according to the invention provides furthermore a positioning of said means 20 and 60 on supports which filter in a passive manner the possible vibrational perturbations that come to contaminate the acoustic signals.

In practice, the supports of the microphones are constituted by a material of elastomer type.

With reference to FIG. 3, the loudspeakers 30G and 30D are disposed in proximity to the protection grille 600, for example at a distance of a few centimeters.

The geometrical arrangement of the loudspeakers and of the microphones complies with a chosen geometrical rule in order to obtain a noise-reduced space of chosen dimensions.

With reference to FIGS. 3 and 4, the applicants have obtained significant results with the following configuration:

distance D1 between the two microphones 20D and 20G, D1=17 cm, distance D2 between the diaphragm of the loudspeaker 30D and that of the associated microphone 20G, D2=4 to 5 cm, distance D3 between the axis of the loudspeaker 30G and the axis of the microphone 20G=15 cm.

The dimensions of the active acoustic attenuation space vary as a function of the frequency of the noise to be attenuated (here, for example, the noise of a turboprop engine of an aircraft).

At frequencies of 68 Hz (associated with the space E1), 136 Hz (E2) and 204 Hz (E3), the dimensions of the noise-reduced spaces E1, E2 and E3, exhibiting an attenuation better than or equal to 3 dB, are the following:

length L1 of space E1: 55 cm, width 11 of spaces E1, E2: 48 cm, height H1 of spaces E1, E2 and E3: 60 cm, length L2 of space E2: 67 cm, length L3 of space E3: 55 cm, width 13 of space E2 (sic): 23 cm, width r1 between the microphone 20 and the front end of space E1: 33 cm, and width r3 between the microphone 20 and the front end of space E3: 23 cm, height H2 between the microphone 20 and the upper end of space E1 or E2: 24 cm.

The following attenuations have been obtained:

attenuation of 12 dB obtained at the fundamental frequency of 68 Hz at a distance of 10 cm from the loudspeaker, attenuation of 30 dB obtained at the harmonic frequency of 136 Hz at a distance of 10 cm from the loudspeaker, attenuation of 25 dB obtained at the harmonic frequency of 204 Hz at a distance of 10 cm from the loudspeaker.

Moreover, the applicants have observed that when the distance D2 between the diaphragm of the loudspeaker and that of the associated microphone increases, the active acoustic attenuation increases.

With reference to FIG. 5, the noise in dB in the device according to the invention is represented by a dashed line and the noise with the device according to the invention is represented by a solid line. These results were obtained at a distance of 10 cm from the source, under noisy average conditions, in stabilized flight, in a turboprop aircraft.

The applicants have observed that a slight gradient exists in the active attenuation in the delimited space in comparison with the conventional techniques.

Furthermore, the applicants have observed that the noise-reduced space obtained in this manner constitutes a space which is noise-reduced, individual, local, interchangeable, and of "generous" dimensions, the active acoustic attenuation of said space being capable of being augmented at least partially by that of another noise-reduced space overlapping said space at least partially and capable of being added to another noise-reduced space without generating parasitical interference.

Thus by virtue of the invention it is possible to obtain good acoustic attenuation in a global volume of chosen dimensions corresponding substantially to the union of the individual noise-reduced spaces thus obtained, with the possibility of modifying at will the dimensions of the global volume by simple addition or withdrawal of an individual space and with the possibility of interchanging an individual space with another in the event of failure of an individual device.

We claim:

1. A personal method for active acoustic attenuation comprising the following stages:
   a) a source (30) is provided that is suitable to deliver an active attenuation signal (SA) in order to reduce an unwanted noise in response to a received control signal,
   b) sensor means (20) are provided for picking up the unwanted noise,
   c) an acoustic structure (2) is provided that is suitable to support the source (30) as well as the sensor means (20) in proximity to the head of an individual,
   d) electronic control means (50) are provided that are suitable to generate the active attenuation control signal for the source,
   e) a selected electrical signal is applied beforehand to the input of the source in order to determine at least the impulse response (H), during a predetermined period, between the output of the source and the input of the sensor means, and
   f) in real time the active acoustic attenuation control signal is determined in accordance with a predetermined processing rule that is established at least in accordance with the impulse response as determined previously, in order to minimize the energy of the signal delivered by the sensor means,
   wherein stage c) consists in converting said acoustic structure (2) while maintaining means of support and protection (520, 600), delimiting a volume (564) where the sensor means (20) and the source (30) are accommodated, said volume being maintained invariant, at least during the determination of the active attenuation control signal and in the presence of the individual, permitting the impulse response (H) between the output of the source (30) and the input of the sensor means (20) to be maintained invariant.

2. A method as claimed in claim 1, comprising moreover the following stage:
   g) remote sensor means (60) are provided, disposed at a chosen location and suitable to pick up, in real time, an unwanted noise that is capable of being propagated from said location towards an active acoustic attenuation space containing at least the head (6) of an individual (8), the processing rule being established moreover in accordance with the remote noise picked up in this manner.

3. A personal device for active acoustic attenuation, of the type comprising:
   a source (30) that is suitable to deliver an active acoustic attenuation signal (SA) in order to reduce an unwanted noise in response to a received control signal,
   sensor means (20) for picking up said unwanted noise,
   an acoustic structure (2) that is suitable to support the source (30) as well as the sensor means (20) in proximity to the head of an individual,
   electronic control means (50) that are suitable to apply, beforehand, a selected electrical signal to the input of the source in order to determine at least one impulse response (H), during a predetermined period, between the output of the source and the input of the sensor means and to determine, in real time, said active attenuation control signal in accordance with a predetermined processing rule that is established at least in accordance with the impulse response as determined previously, in order to minimize the energy of the signal delivered by the sensor means,
   wherein the acoustic structure (2) comprises means of support and protection (520, 600) delimiting a volume (534) where the sensor means (20) and the source (30) are accommodated, said volume being maintained invariant, at least during the determination of the active acoustic attenuation control signal and in the presence of the individual, permitting the impulse response (H) between the output of the source (30) and the input of the sensor means (20) to be maintained invariant.

4. A device as claimed in claim 3, wherein the support means (520) comprise a casing comprising substantially acoustically opaque walls, an opening intended to be in proximity to the head of the individual and a partition which is substantially acoustically opaque and which divides said casing into first (534) and second (532) cavities, the first cavity (534) being open in accordance with said opening and containing the sensor means (20), whereas the source is supported by the partition in such a manner that the signal emitted from the source is propagated directly into the first cavity, towards the opening in the casing.

5. A device as claimed in claim 4, wherein the means of protection (600) comprise an open-worked grille or a similar device which is retractable, covered with a substantially acoustically transparent material and intended to be folded over the opening in the first cavity (534) in order to maintain invariant the volume of said first cavity (534), even in the presence of the individual.

6. A device as claimed claim 3, wherein the acoustic structure (2) is totally integrated within the upper part of a seat or a similar object.

7. A device as claimed in claim 3, wherein the sensor means (20) comprise at least one microphone or a similar device.

8. A device as claimed in claim 3, comprising moreover remote sensor means (60) disposed at a chosen location and suitable to pick up, in real time, an unwanted noise that is capable of being propagated from said location towards a space (4) of active acoustic attenuation containing at least the head (6) of an individual (8), and wherein the electronic control means determine the active attenuation control signal in accordance moreover with the remote noise picked up in this manner.

9. A device as claimed in claim 8, wherein the remote sensor means (60) comprise at least one microphone and/or one accelerometer.

10. A device as claimed in claim 8, wherein the remote sensor means (60) are unidirectional, capable of swivelling and accommodated within a structure (563) that protects against mechanical intrusions.

11. A device as claimed in claim 3, wherein the source (30) comprises at least one loudspeaker or a similar device.

12. A device as claimed in claim 3, wherein the sensor means and/or the remote sensor means are mounted on damping means that are suitable to damp parasitical vibrations.

13. An acoustic structure of seat type or the like, comprising a personal device for active acoustic attenuation as claimed in claim 3.

14. The installation of an active acoustic attenuation system comprising a plurality of acoustic structures as claimed in claim 13, disposed in adjacent manner with a view to adding the acoustic attenuations obtained by said acoustic structures and in this manner obtaining a global noise-reduced space resulting from this addition.

* * * * *